United States Patent [19]
Dray

[11] Patent Number: 5,975,127
[45] Date of Patent: Nov. 2, 1999

[54] SHUT-OFF VALVE

[76] Inventor: R. F. Dray, 6610 Mimosa Dr., Dallas, Tex. 75230

[21] Appl. No.: 08/608,279

[22] Filed: Feb. 28, 1996

[51] Int. Cl.⁶ .................................................. F16K 31/124
[52] U.S. Cl. ............................ 137/495; 425/563; 425/564
[58] Field of Search ..................................... 137/495, 509; 425/563, 564

[56] References Cited

U.S. PATENT DOCUMENTS

| | | | |
|---|---|---|---|
| 3,295,169 | 1/1967 | Moslo | 425/563 X |
| 4,010,903 | 3/1977 | Sakuri et al. | 425/563 |
| 5,012,839 | 5/1991 | Rogers et al. | 425/563 X |
| 5,193,575 | 3/1993 | Do | 137/509 |
| 5,198,238 | 3/1993 | Baxi | 425/564 X |

*Primary Examiner*—Stephen M. Hepperle

[57] ABSTRACT

A shut-off valve is mounted between an injection nozzle and a mold. The valve has a piston within the valve body, A material passage is formed through the piston having an exit aperture and a terminal end. When material is injected through the material passage, the piston is forced to a downstream position which allows the material to flow into the mold. A pneumatic pressure applied to the piston forces the piston to a closed position after injection.

10 Claims, 4 Drawing Sheets

SHUT-OFF VALVE

TECHNICAL FIELD OF THE INVENTION

The present invention relates to a shut-off valve for use on the nozzles of injection molding machines. Specifically, the valve effectively seals the nozzle after injection of a shot of plasticized material into a mold.

BACKGROUND OF THE INVENTION

Injection molding is a widespread method for creating plastic goods. A mold is created with a cavity identical to an original blank of the object to be reproduced. The mold is then held to the nozzle of an injection molding machine. The injection molding machine uses a screw to plasticize plastic pellets and convey a specified amount of plastic into an accumulation area downstream of the screw. The screw then translates forward, pushing the plastic shot through an injection nozzle and into the mold. After injection, the screw rotates, conveying material for a second shot into the accumulation area. This later process is known as recovery.

After injection, in hot runner molds, plastic can drool into the mold cavity, causing an imperfection on the following part. Therefore a need exists for a shut-off valve which immediately stops the flow of plastic through the nozzle once the mold is filled. Further, there is a need for a shut-off valve which can be attached downstream of at least two injection units to allow for co-injection of a mold.

SUMMARY OF THE INVENTION

The present shut-off valve is used to effectively seal the nozzle of an injection molding machine. The shut-off valve is normally placed on the discharge end of the end cap such that material exiting the nozzle must pass through the shut-off valve before entering the mold. In each embodiment of the invention, a piston is captured within a first plenum in the valve body such that the piston can reciprocate between a first/upstream position and a second/downstream position. A material passage, formed through the piston, has a terminal surface and at least one exit aperture. Further the valve body has a second plenum. When the piston is in its downstream position, the exit aperture can communicate with the second plenum, allowing material flowing through the passage to pass into the second plenum. The mold opening is normally placed after a nozzle extension adjacent to an opening in this second plenum.

When injection is completed, air pressure applied against the downstream face of the piston forces the piston back to its first position. A constant air pressure applied to the piston can be selected along with the appropriate surface area for the piston face such that it will overcome any back pressure on the piston after injection is complete, yet yield to the force on the piston experienced during injection.

In another embodiment, the shut-off valve can be used in a co-injection process with two injectors. In this embodiment, a piston has a downstream portion which can reciprocate within the second plenum when the piston reciprocates within the first plenum. A first injector forces its shot into the material passage through the piston. However, the second injector forces its shot into a second entry located in the second plenum. Thus, when the piston is forced to a downstream by a shot from the first injector, its downstream portion blocks the second entry. When the piston returns to its upstream position, however, the second entry is exposed, allowing the second injector to force its shot into the mold.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

The present invention relates to a shut-off valve suitable for use on the nozzle end of an injection molding machine. The shut-off valve 10 has a first valve body 20, a second valve body 40 and a piston 30 slidably disposed therein. The piston travels between a first position, shown in FIG. 1, wherein flow through the valve is blocked and a second position, shown in FIG. 2, wherein flow is allowed.

Figure 1:
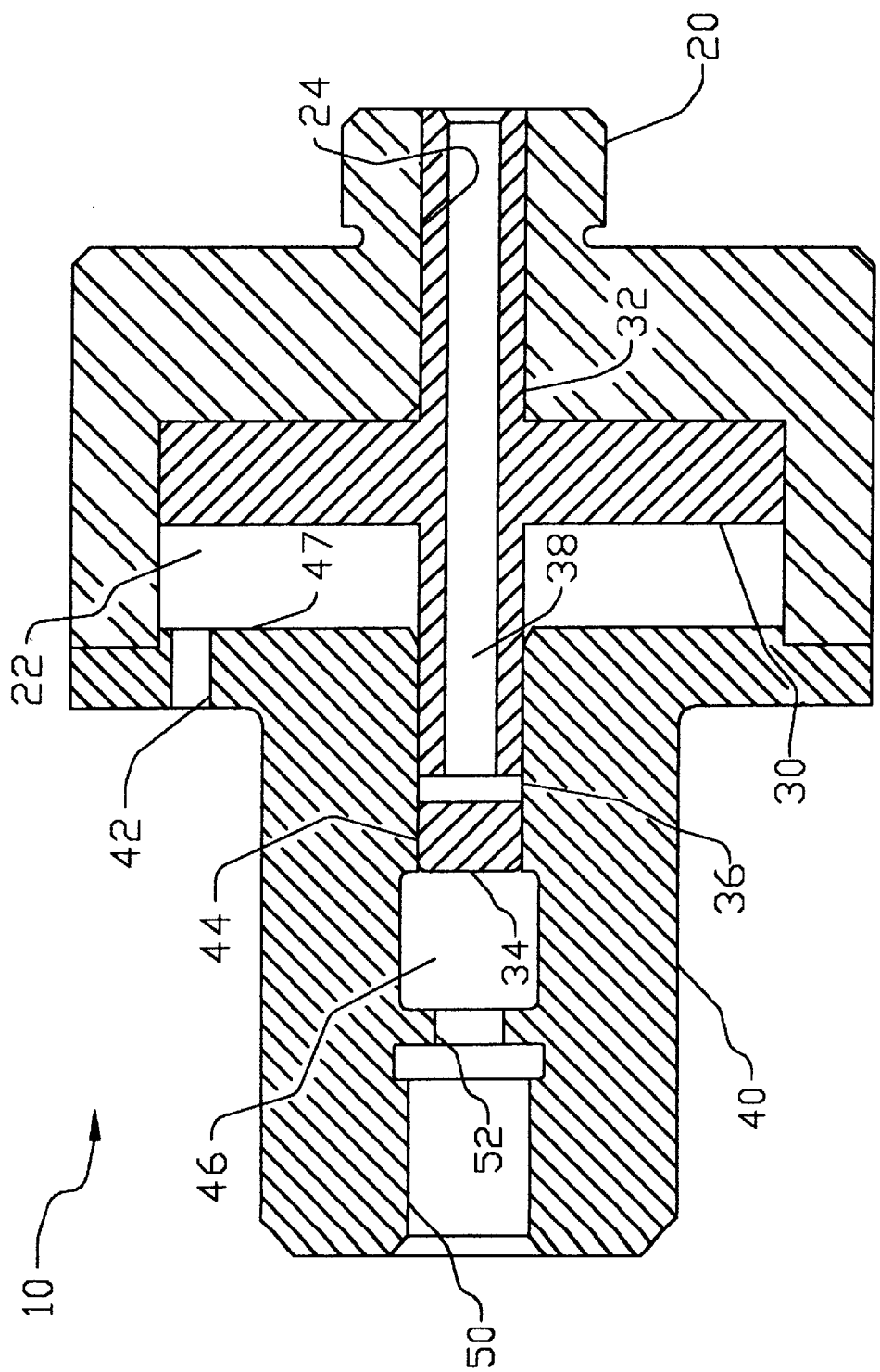
FIG. 1 provides a sectional side view of the shut-off valve, wherein the piston is in a first or "recovery" position.
Figure 2:
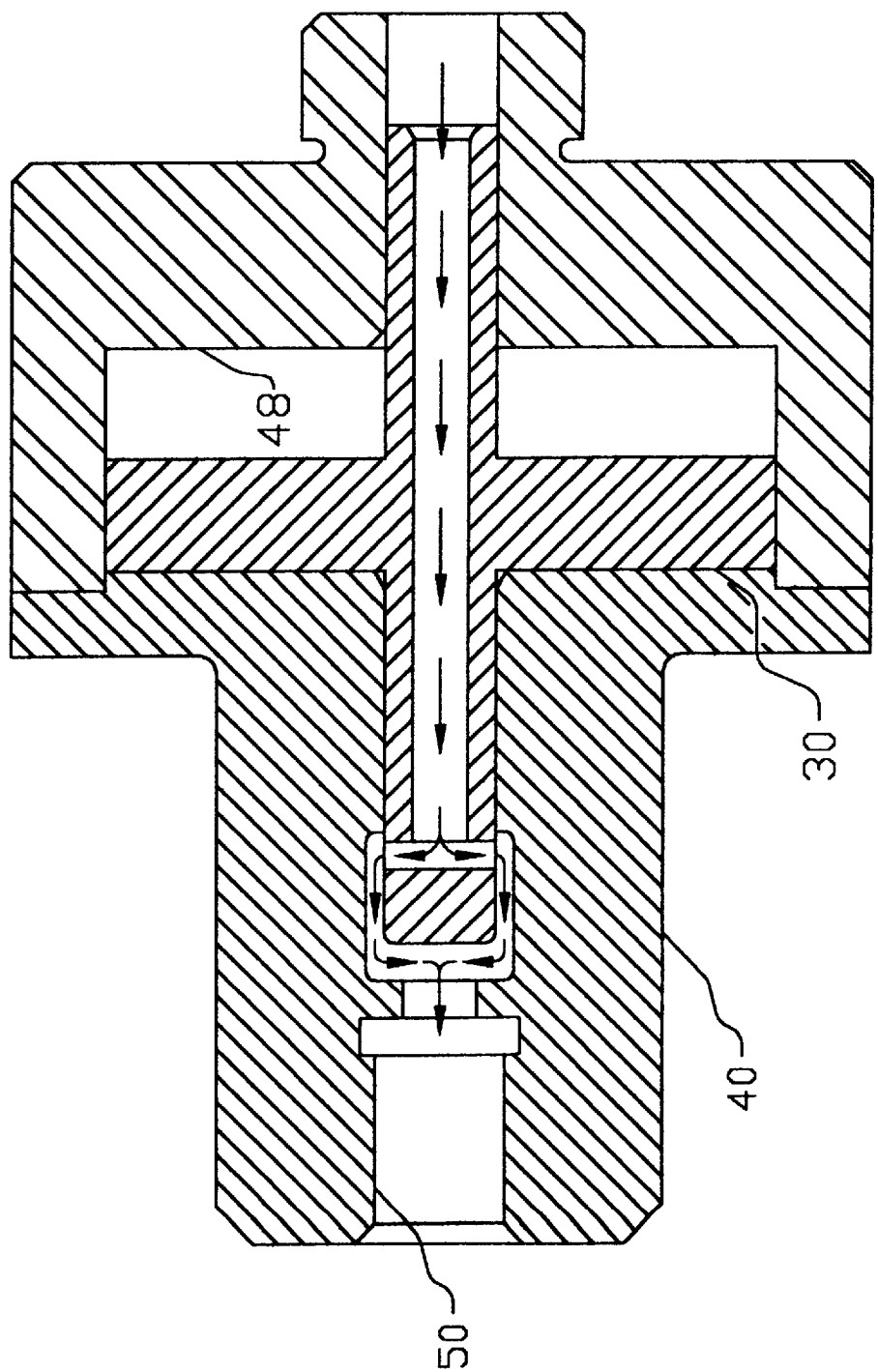
FIG. 2 provides a sectional side view of the shut-off valve in a second, or "injection" position.

Referring to FIG. 1, a plenum 22 is formed between the first and second valve bodies. The first valve body has an upstream passage 24 which can be centrally located. Likewise, the second valve body 40 has a downstream passage 44. A piston 30 is captured in the plenum 22. The piston 30 further has an upstream and downstream portion 32, 34 captured in the upstream and downstream portions 24, 34 of the first and second valve bodies 20, 40. The piston further has a central passage 38 through which plasticized material can flow. At least one exit aperture 36 is located at the downstream end of the passage 38.

When material is forced through the piston 30, it forces the piston to the downstream or second position. The material then flows through the apertures 36 and into a second plenum 46 formed within the second valve body 40. In the first position, the apertures 36 are blocked by the interior walls of the downstream passage 44. Once the material does flow into the second plenum 46, it passes through aperture 52 and into third plenum 50. The third plenum 50 is configured to engage a nozzle. Thus, as the material flows through aperture it flows into the mold (not shown).

The travel of the piston is carefully controlled by the width of the plenum 22. In the first position, the piston contacts the rear wall 48 of the first valve body 20. In the second position, the piston contacts the front wall 49 of the second valve body. A pressurized fluid is applied to the downstream face 30a of the piston through inlet 42. For example, a pneumatic line can be attached to the valve to supply a constant pressure through inlet 42. This pressure creates a force proportional to the area of the piston face 30a. Opposing this pneumatic force is the injection force created against surface 38a. For example, injection pressures can easily reach 20,000 psi. Even applied to a smaller surface, this pressure creates a force which overcomes the pneumatic force on the piston, thus forcing the piston to the open second position. However, after injection, during the recovery phase, only minor back pressure is applied to the surface 38a. This force is then overcome by the air pressure in the plenum, closing the valve. In one embodiment, a constant pressure can be applied through inlet 42. In another embodiment, a solenoid operated air valve could be used to control the flow of air into the plenum.

Figure 3:
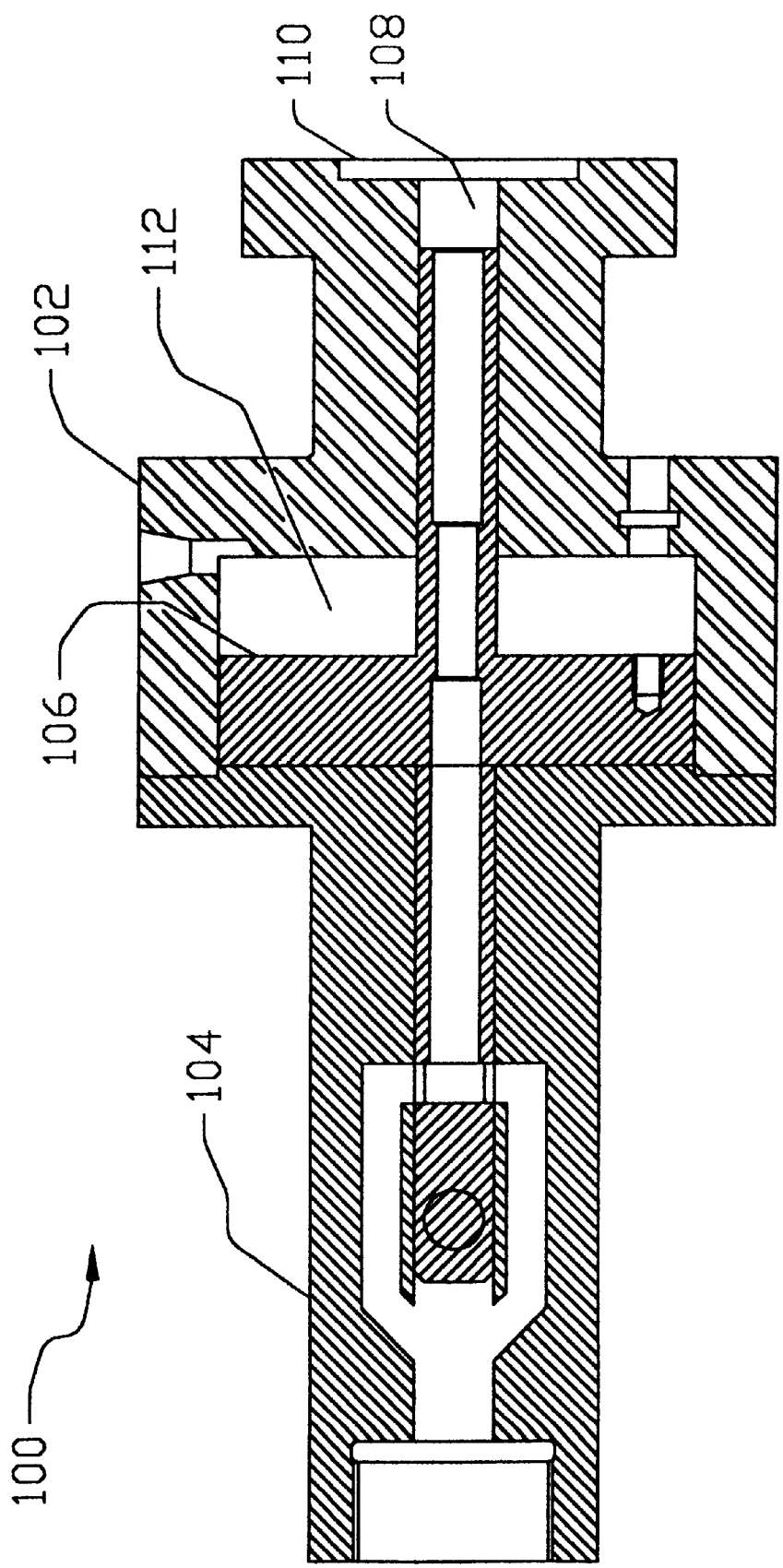
FIGS. 3 and 4 illustrate another embodiment of the invention wherein a second injection path enters the second plenum of the shut-off valve.
Figure 4:
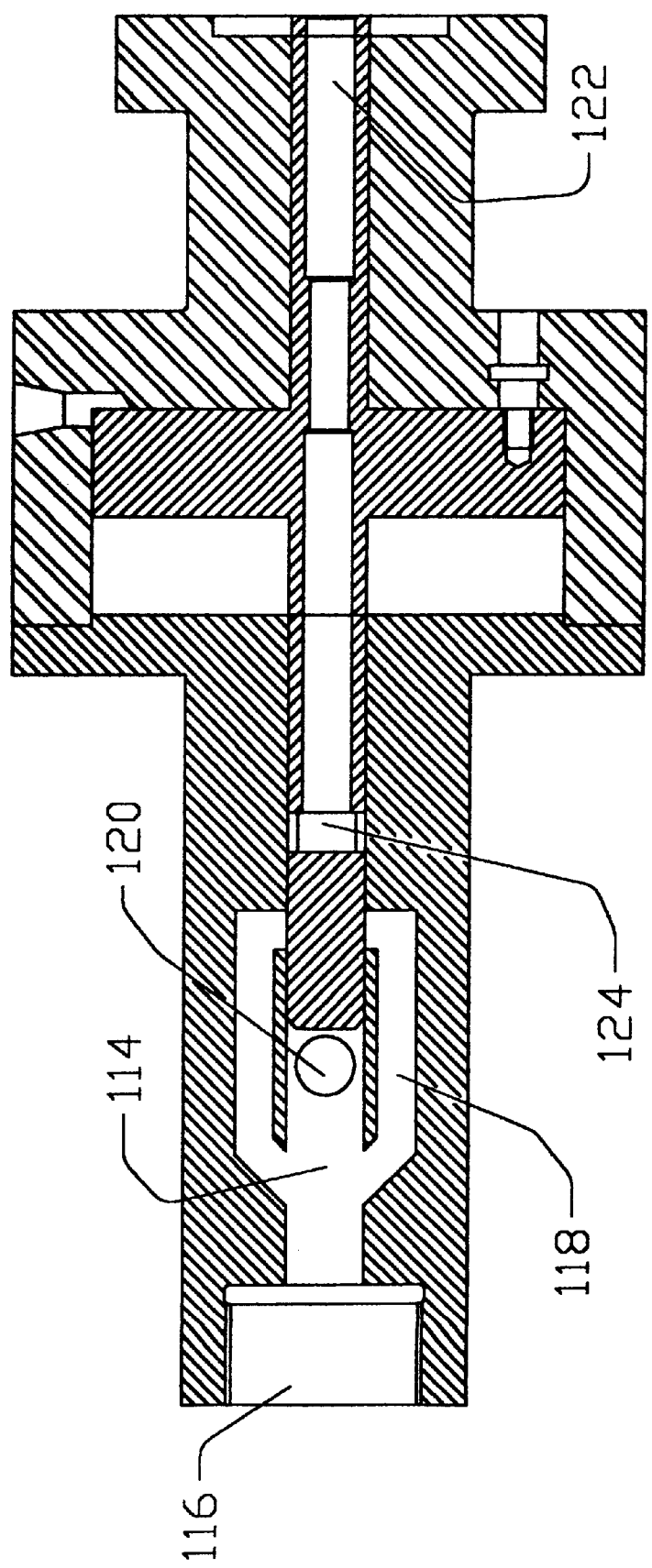

FIGS. 3 and 4 illustrate an alternative embodiment of the shut-off valve which would be suitable for co-injection. This valve is placed downstream of two injection molding machines. Plasticized material can be injected alternatively through the valve to the exclusion of the other machine. This is particularly well-suited when two grades or colors of plastic are to be used in a single mold. As with the earlier embodiments, the valve is formed by first and second valve bodies 102, 104, with a piston 106 captured within. A first plenum 112 is formed within the valve bodies to control the travel of the piston.

A passage 122 is formed through the center of the piston 106. The passage 122 has at least one exit aperture 124. In the downstream position, this exit aperture 124 aligns with at least one passage 118 which leads to the mold (not shown) placed in the mold receptor 116. In the downstream position which is caused by the injection cycle of the inline injection unit, the piston occupies the second plenum 114. After injection is complete in the inline injection unit, air pressure is released through a valve forcing the piston to a closed position for the inline injection unit.

FIG. 4 illustrates the piston in a closed position. However, in the closed position a second entry 120 is opened to the second plenum 114. This second entry is downstream of the accumulation area of a second injection molding machine. In use, the first injector, received in port 110, injects its shot of plastic through the shut-off valve 100 and into the mold. During the injection step, the valve is closed to the second injector. The piston is initially moved downstream and then, during recovery, is forced back to its upstream, closed position. Once the second entry 120 is exposed, a second injection unit can inject its shot into the shut-off valve and into the mold.

In each of the embodiments discussed above, suitable O-rings and piston rings should be used, as would be appreciated by those skilled in the art. Also, although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. For example, reference to a first and second valve bodies merely recognizes a common way of manufacturing valves. Accordingly, the present invention is intended to encompass such rearrangements, modifications, and substitutions of parts and elements as fall within the scope of the appended claims.

It is important to specify that the opening of the valve is created by injection pressure. Many prior art valves can "deadhead", or remain in the closed position if they do not actuate. This mode of failure can result in a catastrophic damage to the injection unit. Further, many prior art valves have leakage and require seals. The present invention has no paths that would allow for material leakage and therefore does not require extensive sealing. Further, many prior art valves are hydraulically actuated. If the hydraulic fluid leaks, it can create a fire hazard. This problem is alleviated by using air pressure to close the present valve.

I claim:

1. A shut-off valve for injecting a working fluid comprising:
   (a) a valve body having a distinct first plenum and a distinct second plenum;
   (b) a piston within the valve body having a piston face within the first plenum in contact with a control fluid, said first plenum being dimensioned to limit the travel of the piston between a downstream or an upstream position;
   (c) a material passage through said piston, in fluid communication with the second plenum, having an exit aperture for transmission of the working fluid and a terminal surface.

2. The shutoff valve of claim 1 wherein the exit aperture communicates with the second plenum only when the piston is in the downstream position.

3. A shut-off valve for injecting a working fluid comprising:
   (a) a valve body having a distinct first plenum and a distinct second plenum;
   (b) a piston within the valve body having a piston face within the first plenum in contact with a control fluid;
   (c) a material passage through said piston, in fluid communication with the second plenum, having an exit aperture for transmission of the working fluid and a terminal surface; and
   (d) pressure means opeartively coupled to the valve body to apply a control fluid predetermined pressure to the piston face.

4. A shut-off valve for use on an injection molding machine wherein material injected from said machine passes through the shut-off valve and into a mold, said shut-off valve comprises:
   (a) a valve body having a first distinct plenum and a second distinct plenum;
   (b) a piston captured within the valve body having a piston face within the first plenum;
   (c) a material passage through said piston having an exit aperture and a terminal surface, wherein the material applies a material pressure against the terminal surface;
   (d) pressure means operatively coupled to the valve body to apply a predetermined pressure to the piston face.

5. The shut-off valve of claim 4 wherein said pressure means is a pneumatic pressure source.

6. The shutoff valve of claim 5 wherein said material pressure during injection creates a material force on the terminal surface which is greater than a pneumatic force created by the predetermined pressure applied to the piston face.

7. A fluid controlled shut off valve for injecting a working material comprising:
   (a) a valve body having a first distinct plenum and a distinct second plenum;
   (b) a piston slidably disposed within the valve body having a piston face within the first plenum in contact with a source of control fluid;
   (c) an exit aperture on the second plenum;
   (d) a closeable passage in said piston in communication with the exit aperture; and
   (e) a valve surface between the piston and the second plenum which is adapted to close the passage when the control fluid is applied to the piston face.

8. A fluid controlled shut off valve for injecting a working fluid comprising:
   (a) a valve body having a first distinct plenum and a distinct second plenum;
   (b) a piston slidably disposed within the valve body having an upstream position and a downstream position;
   (c) The piston having a face within the first plenum in contact with a source of control fluid;
   (e) an exit aperture in the second plenum;
   (f) a passage in said piston in closeable communication with the exit aperture; and
   (g) a valve surface between the piston and the second plenum which is adapted to close the passage when the piston is moved to the upstream position by the control fluid.

9. A fluid controlled shut off valve for injecting a working fluid comprising:
   (a) a valve body having a first distinct plenum and a distinct second plenum;
   (b) a piston slidably disposed within the valve body having a piston face within the first plenum in contact with a source of control fluid;
   (c) an exit aperture in the second plenum;
   (d) an entrance port in the second plenum in closeable communication with the exit aperture and working fluid source, wherein the entrance port is closed when the piston is in a downstream position and open when the piston is in an upstream position;
   (e) a passage in said piston in closeable communication with the exit aperture; and
   (f) a valve surface between the piston and the second plenum which is adapted to close the passage when the piston is moved to the upstream position by the control fluid.

10. A fluid controlled shut-off valve for injecting a working fluid comprising:
   (a) A valve body having a first plenum and a second plenum;
   (b) A piston slidably disposed within the valve body having a piston face withing the first plenum in contact with a source of control fluid;
   (c) A passage in said piston in fluid communication with the working fluid;
   (d) A plurality of conduits, unconnected to said passage and said second plenum when said control fluid exerts increased pressure on said piston face and connected to said second plenum when said control fluid exerts reduced pressure on said piston face.

* * * * *